United States Patent [19]
Woolman

[11] 3,818,609
[45] June 25, 1974

[54] DEVICE FOR PAIRED LEARNING AND PROCESS THEREOF

[76] Inventor: Myron Woolman, 4828 16th St. N.W., New York, N.Y. 20011

[22] Filed: Sept. 18, 1972

[21] Appl. No.: 289,587

Related U.S. Application Data

[63] Continuation of Ser. No. 41,167, May 28, 1970, abandoned.

[52] U.S. Cl. .................................. 35/8 R, 35/60
[51] Int. Cl. ........................................ G09b 7/00
[58] Field of Search ............ 35/8 R, 8 B, 9 F, 35 C, 35/60; 273/130 AB, 130 B, 130 AC; 235/52; 312/196

[56] References Cited
UNITED STATES PATENTS

| | | | |
|---|---|---|---|
| 2,238,267 | 4/1941 | Katz | 35/60 UX |
| 2,647,749 | 8/1953 | Wales | 35/8 R X |
| 2,942,924 | 6/1960 | Stangert | 312/196 X |
| 3,149,841 | 9/1964 | Hullman | 273/130 AB |
| 3,224,778 | 12/1965 | Schram | 273/130 AB |
| 3,500,555 | 3/1970 | Best | 35/8 R |
| 3,522,664 | 8/1970 | Lambright | 35/8 R |

Primary Examiner—Harland S. Skogquist
Attorney, Agent, or Firm—Gary L. Jordan

[57] ABSTRACT

A device to facilitate mutually interactive paired learning by at least one learner pair is provided and is comprised of a work space to provide for at least one learner pair and a presentation means for transmitting to the learner pair a cross-synchronized stimulus field. The stimulus field presented consists of programmed and sequenced intelligence elements consisting of instructional information, response designation signals, interrogatory stimuli, and programmatically correct responses arranged in a manner for each of the learners of said learner pair to respond in a controlled fashion to the interrogatory stimuli according to information received from the response signals of the other pair member and to then individually and mutually compare the programmatically correct responses with the individual and joint responses given by the learner pair.

61 Claims, 15 Drawing Figures

INVENTOR.
MYRON WOOLMAN
BY
Gary L. Jordan
ATTORNEY

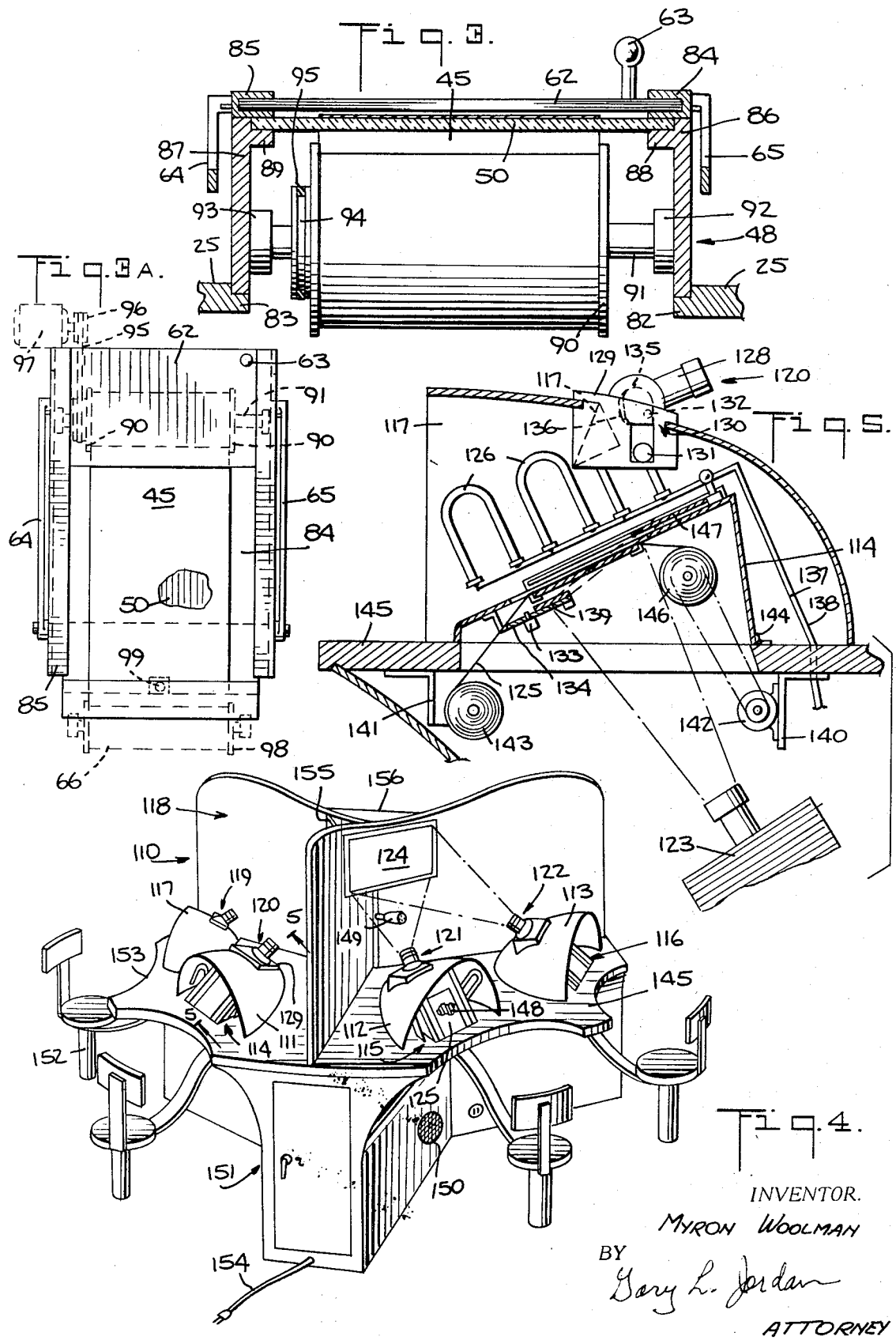

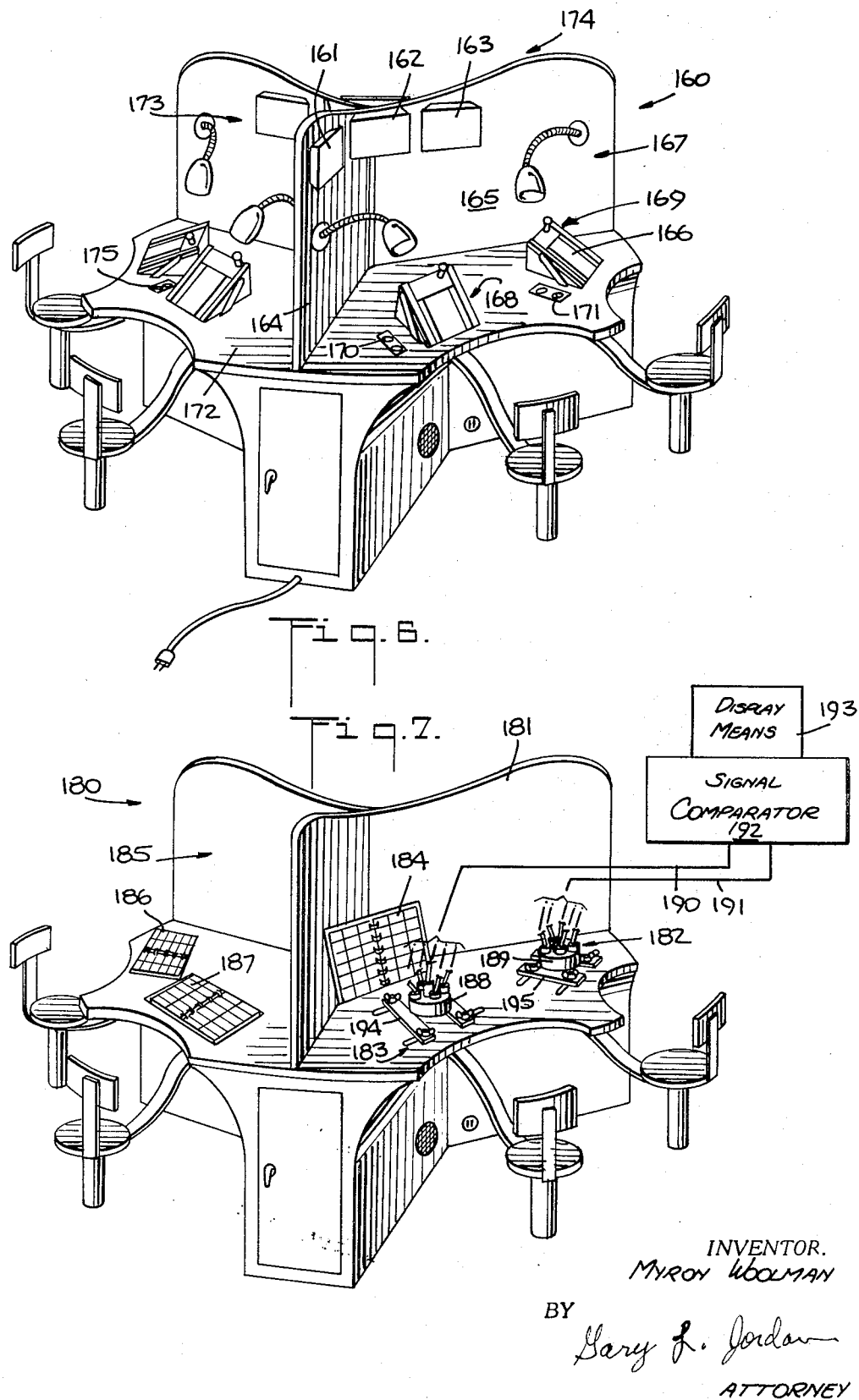

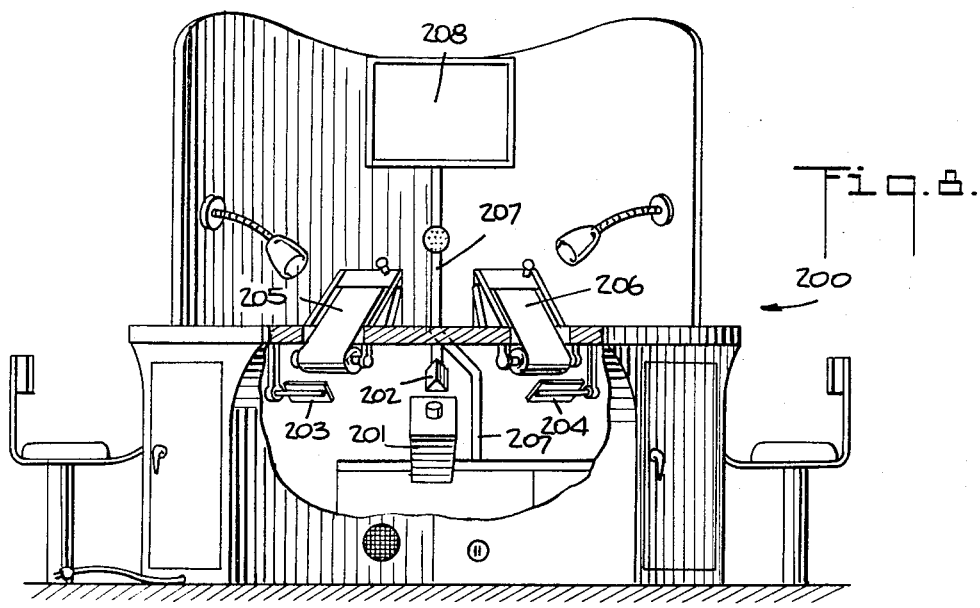
Fig. 8.
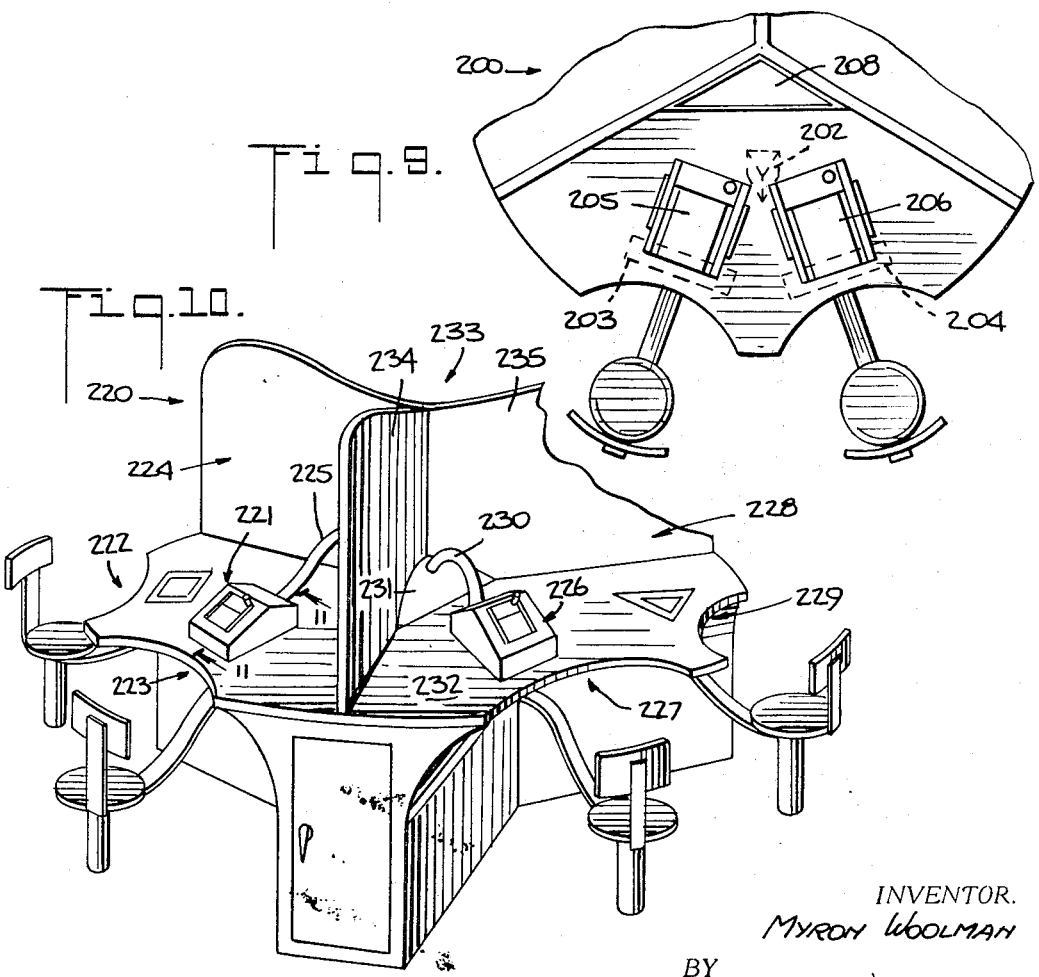
Fig. 9.
Fig. 10.
INVENTOR.
MYRON WOOLMAN
BY
Gary L. Jordan
ATTORNEY

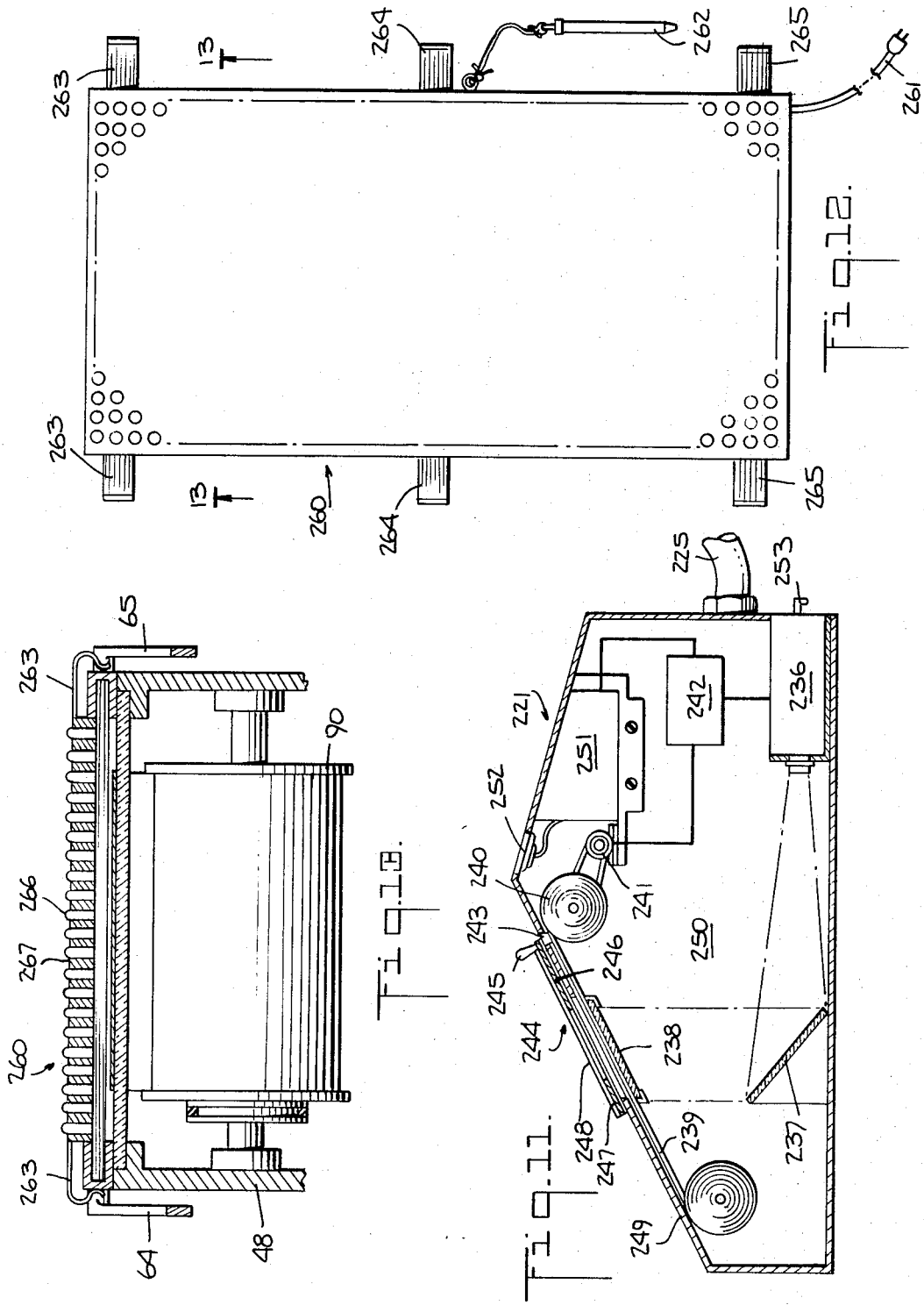

DEVICE FOR PAIRED LEARNING AND PROCESS THEREOF

CROSS-REFERENCE TO RELATED APPLICATION

This application is a continuation of application Ser. No. 41,167, filed May 28, 1970, and now abandoned.

BACKGROUND OF THE INVENTION

This invention relates to a device to facilitate mutually interactive paired learning by providing a work space for at least one learner pair and for providing a presentation means located within said work space for transmitting to the learner pair a cross-synchronized stimulus field.

More particularly, it relates to a device for presenting audio-visual, and tactile stimuli to the learner pair as well as stimuli derived from learning simulator units and for requiring responses from the learner pair in a controlled and systematic fashion wherein the responses made are recorded and then compared with the programmatically correct responses in a manner which is controlled between each of the learners of the learning pair by response signals given to them as part of the stimulus field.

Paired learning is the term which is used herein to summarize a new operational theory of programmed instruction. According to this theory, the individual human learner learns programmed instructional content more efficiently in a mutually interactive fashion and he learns more efficiently in this situation both in terms of mental retention and required completion time than in a situation wherein the individual learner works his way alone through a body of instructional content. This increased efficiency holds for both the situation where the individual learner is reading a textbook as well as where the individual learner self-paces himself through a course of programmed instruction. In practice, this operational theory results in students quickly becoming motivated by mutually interactive paired learning with their negative partners; thus, they overcome the frequently observed boredom syndrome associated with highly individualized learning routines. In addition, this new paired learning operational theory presents a number of additional advantages over conventional individualized instruction. Primary among these advantages is that language learning is greatly facilitated by a paired learning context since language is fundamentally a didactic (interactive teaching) process requiring at least two persons. This greater efficiency in language learning holds for all language learning situations including the initial learning of a first language, the learning of a second language, and the learning of various levels of specialized technical languages. The second advantage is that in a paired learning context the social interaction skills of the students are greatly enhanced. The learners, due to the fact that they are continually working with another learner, rapidly increase their level of social interaction. Also, since the learners may be rotated into and out of various paired situations, the classroom of learners rapidly generates a micro-society in which mastery of the presented instructional content is a function of interaction with another student. This permits the development of new student roles in which he is a monitor and evaluator and these roles generate status differences and act to motivate students as part of the micro-society of the classroom.

Another benefit offered by the paired learning theory is that, in this context, the number of responses made by the learner pair to the programmed course content is much higher than in the traditional stand-up teacher classroom wherein students only occasionally make learning responses. The increased response rate and the absence of boredom due to required social interactions with the other learner of the pair result in greater willingness to maintain involvement in learning tasks until a learning goal has been reached and also increases the feeling of satisfaction in having achieved those goals as part of a team effort. These advantages allow the classroom to become perceived as a primary life situation for all learners involved in the pairing activites and related status-role requirements rather than just of primary importance to the few highly motivated learners found in the conventional classrooms. In such a micro-society as is generated by paired learning all students operate in a behavioral pattern involving high responsivity and, therefore, higher learning efficiency relative to static stand-up teacher learner requirements.

The prior art shows a number of devices for providing individual programmed instruction. U.S. Pat. No. 3,233,346 to Cornberg shows a learning carrel wherein individual learners are placed into paneled cubicles in order to individually concentrate on a prepared program of audio-visual instructional material. Other individual teaching devices are disclosed in U.S. Pat. Nos. 2,846,779 to Skinner, 2,837,839 to Fernbach and 2,401,434 to Mills. U.S. Pat. No. 3,162,959 to Woolman is another more advanced form of an individualized instructional device. The art has not developed devices for paired learning through stimuli which are jointly perceived in a field of stimuli which is common to only that pair of learners since the heretofore overwhelming emphasis has been on individual instruction of either the traditional stand-up teacher form or the programmed instruction form.

The prior art covering individual programmed instruction involves a learner using a programmed text or machine so that the learner responds directly and individually to the materials. Following each response, he alone has an opportunity to ascertain the correctness or incorrectness of his response. Individual programmed instruction is solipsistic and involves the interaction of an individual with an object in the form of a text or vehicle for carrying information and accepting his responses and providing feedback for his use. This form of instruction is an efficient tool for insuring that learners can produce responses within instructional content areas. However, it eliminates the many benefits which can be derived both motivationally and instructionally by working with another human being in a common learning experience. The paired learning program or system permits learners to work on the same material so that the responses of each are made more accurate and more reliable by the information and skills of the other. This joint and mutually reciprocating effort differs in kind and in outcome from anything possible in the prior art covered by individual instructional programmed texts or machines.

Intrinsic to the learning activity in a paired learning programmed system is the fact that for part of the time, each learner is responding to the previous responses made by the other learner rather than merely making continuous responses to a program designed for individual use. Thus each learner works in a complementary cross-synchronized program so designed that the work of each is supportive to the work of the other to insure the adequacy of learning outcomes. This type of response, i.e., responding to the responses previously made by one's learner partner, is not possible in the prior individualized programmed instruction art.

As used herein, a cross-synchronized field of stimulus includes program intelligence elements of the following types: instructional information, cross-synchronized response designation signals, cross-synchronized interrogatory stimuli, and programmatically correct responses for comparison with learner produced responses which in turn operate as an additional intelligence element in the stimulus field. The process of using the program intelligence elements comprises the following steps: designating a first learner and a second learner of the learner pair so that instructional information and response designation signals may be established and individualized between the learner or learning pair, presenting an instructional information stimulus field to the learner pair, presenting cross-synchronized response designation signals to the learner pair to designate the type and sequence of responses required by the first learner and the type and sequence of responses required by the second learner, presenting the cross-synchronized interrogatory stimuli to the learner pair in which the various stimuli are designated for response by the first and the second learner according to the presented response designation signals, providing for the recordation of the responses of each of the learners, and providing for the comparison of the recorded responses with respect to the programmatically correct responses by displaying the programmatically correct responses to the interrogatory stimuli to both of the learners so that a mutually interactive and cross-synchronized paired learning loop can be established and maintained between the learner pair. The comparison means are so designed as to permit each of the learners to perceive the correctness or incorrectness of the responses made by each member of the learner pair. The perceived correctness of a response increases the probability of recurrence of that same response in the presence of the same or similar stimuli. A learning loop occurs as the learner modifies his pattern of responses so as to increase the relative probability of matching his responses with the programmatically correct responses which operate as a feedback system for modifying and correcting the responses he makes. In paired learning, this feedback is supplied by the program and also by the learning partners. In order for this process to be effective between a learner pair and to allow the learning loop to be established and maintained, it is necessary for the learning pair to jointly comprehend the cross-synchronized instructional information sequence and to respond to the interrogatory stimuli as required by the response designation signals, to compare the joint responses recorded with the programmatically correct responses presented and to modify responses as required to form paired learning loops.

The paired learning process can be described graphically by assigning symbols to the various above-described steps as follows for learner 1 and learner 2:

SF = presenting an instructional information stimulus field to the learner pair,
$D_1$ = designating one of the learners as learner 1 for interaction with SF and the other learners,
$D_2$ = designating the other learner as learner 2 for interaction with SF and learner 1,
$S_{1,2}$ = presenting cross-synchronized response designation signals to the learner pair,
$I_s$ = presenting the cross-synchronized interrogatory stimuli to the pair,
$R_1$ = making and/or recording of responses to $I_s$ by learner 1,
$R_2$ = making of and/or recording of responses to $I_s$ by learner 2,
$C_{1,2}$ = comparison of the recorded responses with respect to the programmatically correct responses displayed by learner 1 and learner 2, and
$L_{1,2}$ = establishment of the paired learner loop between learner 1 and learner 2. The process flow diagram is then:

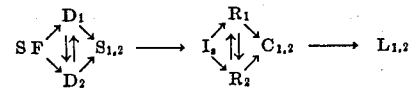

Wherein the symbols have the above meanings and the reversible arrows between $D_1$ and $D_2$ indicate the constantly interacting perceptions and communications between learners 1 and 2. The reversible arrows between $R_1$ and $R_2$ show that the responses which each of the learners makes is, in part, dependent on the responses made by the other learner and is interactive therewith. The process is fully distinguishable from individualized instruction wherein steps $D_2$, $S_{1,2}$, and $R_2$ are not required and wherein there are no reversible arrows for interactions and $C_{1,2}$ and $L_{1,2}$ are not joint and interactive but are only individualized steps.

While the steps $D_1$ and $D_2$ are shown following SF, they could precede this step in actual operation and while step $S_{1,2}$ has been shown preceding step $I_s$, it could follow that step in actual operation of the process.

This process of paired learning and the necessary mutually interactive and cross-synchronized paired learning loops can be most effectively conducted and maintained when the same cross-synchronized stimulus field including instructional information is sequentially presented to the learning pair by separate presentation means and the learning pair required to respond to the interrogatory stimuli in a controlled and mutually interactive fashion by recording their responses on separate recordation means to form completed program units. The images of these completed program units can then preferably be combined at a single image area whereby both of the learners of the learning pair can view their mutual responses displayed within the image of the presented program intelligence elements. The combination of the images of the completed program units can be by means of separate video cameras focused on these images or can be combined into optical images created by the use of a prism means which combines the images and focuses them for a single video camera. The responses required can be sequentially divided between the learner pair so that only one of the learners responds to a given interrogatory stimulus or the program can be structured to require responses from both of the learners for a given interrogatory stimulus.

Another means to provide combined images is for the images of the two separate completed program units to be combined on a single screen by means of two opaque projectors. If desired, the opaque projector means or the video camera means may be used to display combined images or individual images of the completed program unit.

Another way to provide a device for paired learning is to provide a work space for the learner pair and set into this work space a presentation means for transmitting the cross-synchronized stimulus field which consists of a printed information web containing thereon all of the above program intelligence elements. Yet another means is to provide interconnected simulator units within the work space whereby the physical manipulations of the simulator units can be compared by a signal comparator means so that the responses of the learners can be compared with the programmatically correct responses.

In view of the above, it is an object of this invention to provide a device to facilitate mutually interactive paired learning by at least one learner pair wherein a work space is provided for the learner pair and wherein a presentation means located within said work space is provided for transmitting to the learner pair a cross-synchronized stimulus field.

Another object of this invention is to present an instructional program of a cross-synchronized field of stimulus to a learner pair wherein an intelligence storage means is provided for storing the program intelligence elements consisting of instructional information, response designation signals, interrogatory stimuli, and programmatically correct responses.

Yet another object of the present invention is to provide a device of the above type wherein a display means is included for displaying to the learner pair predesignated program elements and the completed program units formed by the learner pair's responses to the presented stimuli. The display means can function to display the completed program units of both of the learners in a single image area or in separate image areas, either as prearranged functions of the display means or by selection of the learners.

Yet another object of the present invention is to provide a presentation means for the cross-synchronized field of stimuli which can be computer-controlled.

Another object of the present invention is to provide learner positioning means in order to control the relative positions of each of the learners of said learner pair with respect to each other in relationship to the work space of said device for focusing the perception of the learner pair on the presented cross-synchronized stimulus field.

Yet another object of the present invention is to provide a perception convergence means for the device of this invention to focus the perception of each of the learners of said learner pair one to one another and onto a cross-synchronized stimulus field whereby the learner stimuli to said learner pair can be fully specified and control exercised over interactive responses between the learning pair.

Another object of the present invention is to provide a presentation means for the above-referred-to device comprised of separate intelligence storage means for each learner of the learner pair and separate recordation means for each learner of the learner pair for recording responses made to the presented cross-synchronized stimulus field.

Yet another object of the present invention is to present a process for providing mutually interactive paired learning between a learner pair.

Another object of the present invention is to provide a process of mutually interactive paired learning for a learner pair.

These and other objects and advantages of this invention will become apparent from the following description and claims. The invention can best be understood by a reference to the accompanying drawings illustrating several embodiments of the present invention:

DESCRIPTION OF THE DRAWINGS

FIG. 3 is an enlarged sectional view of the positional indicator housing shown in FIG. 1 taken on the line 3—3;

FIG. 3A is an enlarged plan view of a portion of the positional indicator housing shown in FIG. 1;

FIG. 3B shows an enlarged fragmentary view of the operating switch illustrated in FIG. 3A;

FIG. 4 is a perspective view of a first modification of the preferred embodiment illustrated in FIG. 1 wherein opaque projection means are provided;

FIG. 5 is an enlarged cross-sectional view of one of the opaque projection means illustrated in FIG. 4 taken on the line 5—5;

FIG. 6 is a perspective view of a third modification of the device illustrated in FIG. 1 wherein multiple display means are provided;

FIG. 7 is a perspective view of a third modification of the preferred embodiment illustrated in FIG. 1;

FIG. 8 is a front cutaway view of a fourth modification of the preferred embodiment illustrated in FIG. 1;

FIG. 9 is a plan view of the device as illustrated in FIG. 8;

FIG. 10 is another modification of the preferred embodiment of the device illustrated in FIG. 1;

FIG. 11 is an enlarged cross-sectional view of the presentation means shown in FIG. 10 taken on line 11—11;

FIG. 12 illustrates a plan view of a tactile drawing device which can be used in conjunction with the devices of FIGS. 1, 2, 4, 5, 6 and 8 above; and FIG. 13 illustrates a cross-sectional view of the tactile drawing device shown in FIG. 12 in cooperative relationship with the positional indicator housing of the designated devices.

PREFERRED EMBODIMENT

Figure 1:
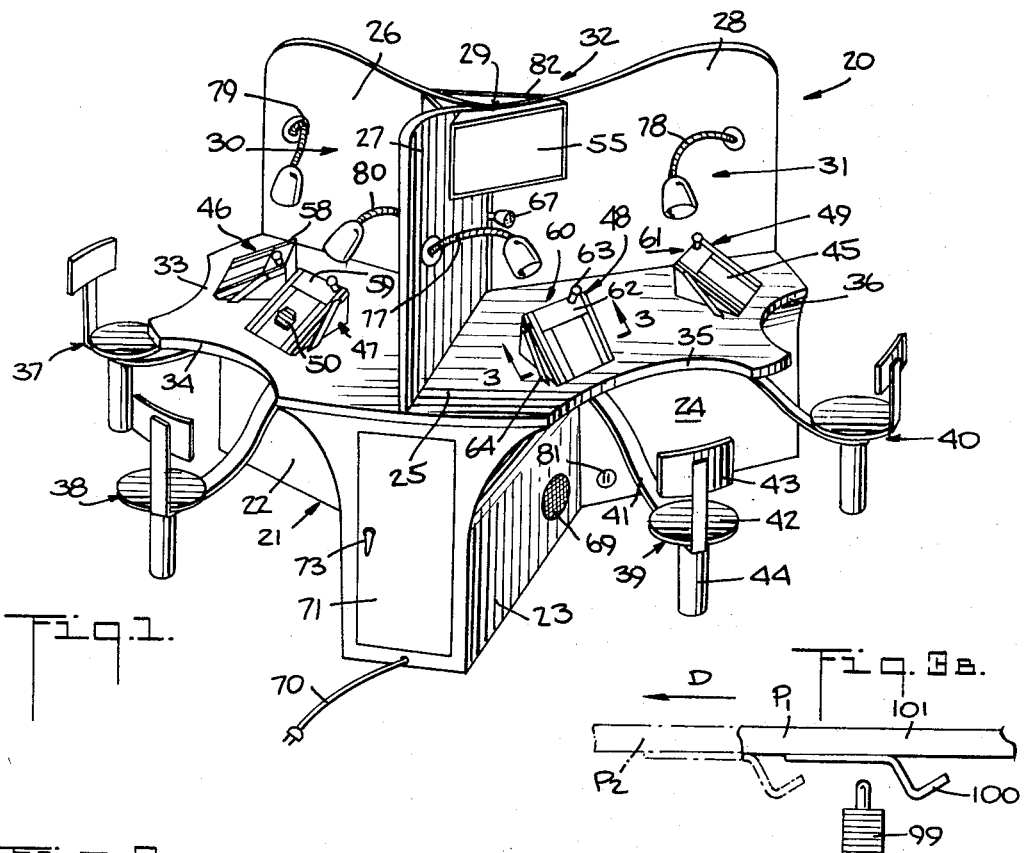
FIG. 1 is a perspective view of the preferred embodiment of the device for paired learning.
Figure 2:
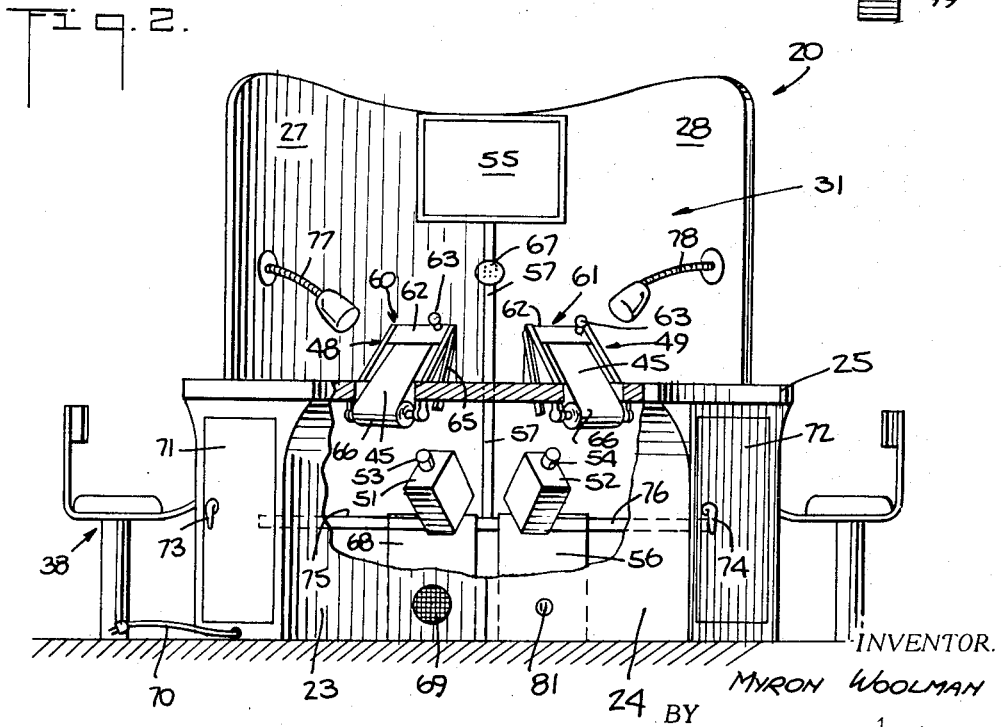
FIG. 2 is a front view of the device of FIG. 1 wherein a portion of the device is shown in cutaway view to expose the presentation means for the cross-synchronized field of stimulus.

FIGS. 1 and 2 illustrate a preferred form of the present invention wherein a paired learning device 20 is provided to accommodate three pairs of learners.

A base housing 21 is provided with three radial support base units 22, 23 and 24 arranged along radial lines separated from one another by 120°. The base housing 21 supports horizontal barrier member 25 which has a substantially circular configuration. Three up-right panels 26, 27 and 28 are connected in an upstanding manner onto the upper surface of horizontal barrier member 25 in a radial fashion from central position 28 at which position the inner edges of each of these panels are interconnected. The up-right barrier panels are aligned with the 120° radial lines on which the support bases 22, 23 and 24 are aligned. The convergence of upright panels 26 and 27 toward the center position 29 of horizontal barrier member 25 forms a first work space 30 while the convergence and central intersection of up-right barrier panels 27 and 28 forms a second work space 31. A third work space 32 is formed by the intersection and convergence of panels 26 and 28, however, the horizontal barrier member of this work space 32 cannot be seen in FIG. 1.

A first learner positioning indentation 33 and a second learner positioning indentation 34 are shown in the outer edge portions of horizontal barrier member 25 within work space 30. These indentations are generally of semicircular nature and serve to position two learners in work space 30 to engage in a program of paired learning. Similar learner positioning indentations 35 and 36 are formed in the outer portions of horizontal barrier member 25 for work space 31.

Learner seat 37 is provided in association with indentation 33 and learner seat 38 is provided in association with indentation 34 while a third learner seat 39 is provided in association with indentation 35 of work space 31 and learner seat 40 is provided in association with indentation 36. Each of the learner seats consists of a seat support arm 41, a seat portion 42, a backrest 43 and a support leg 44 as shown on learner seat 39. The seat support arms 41 are connected to the underside of horizontal barrier member 25 on the support bases 22, 23 and 24 and are curvilinear in form as shown. Each of the indentations 33, 34, 35, and 36 and each of the seats 37, 38, 39 and 40 serve as separate learner positioning means to focus the perceptions of learners into work spaces 30 and 31, respectively. Either one of these positioning means can be employed separately and in the event that only the learner positioning indentations are employed conventional removable chairs can be employed for the learner seats illustrated.

The device 20 as above-described contains components connected therein to present a cross-synchronized stimulus field of audio-visual stimuli to each of three learner pairs when each pair is positioned in one of the work spaces provided. The major component is the program presentation means for transmitting to each learner pair the cross-synchronized stimulus field. The presentation means as here illustrated comprises a series of printed information webs 45 which serve as an intelligence storage means for printed program informational stimuli for each learner. Information webs 45 also function as recordation means by providing recordation spaces upon which the learners can record their written responses to the program.

Information webs 45 are positioned for movement along their longitudinal axes in each of positional indicator housings 46, 47, 48, and 49 which are affixed to horizontal barrier member 25 at positions aligned with the centers of the learner seats 37, 38, 39, and 40 and the mid-points of the learner positioning indentations 33, 34, 35 and 36, respectively. The positional axis defined by the longitudinal axis of the housing and the center of the learner seat for each learner position is aligned with the mid-point of the positioning indentation for each position. The angle between the two positional axes in the work spaces is approximately 40° as shown. This angle can be increased to 130° if desired. Due to this relationship the housings 46, 47, 48 and 49 function as learner positioning means to position learner pairs in order to converge their mutual perception upon the cross-synchronized field of stimulus presented. The positional indicator housings can function as the sole positioning means if desired.

Information webs 45 rest on transparent plates 50 which are mounted within each housing as shown in the partial cutaway view of housing 37. The transparent plates are supported within the housings 46, 47, 48 and 49 in a horizontally inclined position to facilitate ease of writing by the learners. The purposes of transparent plates 50 are to support information webs 45 and to allow the intelligence images and responses recorded thereon to be focused upon by video cameras 51 and 52 as shown in FIg. 2 one each of which are provided for each of the positional indicator housings 48 and 49, respectively, for work space 31. Each of these video cameras is positioned within base support 21 so that the plane of the associated information web is parallel with the focal plane of the camera lens systems 53 and 54 which are integral with cameras 51 and 52, respectively.

The image signals generated by video cameras 51 and 52 are presented in a combined manner on video display screen 55 which is located in the upper portion of the space defined by the intersection of up-right barrier panels 27 and 28 at central position 29 and which provides program feedback of the programmatically correct answers to the learner pair to establish a paired learning loop. The combination of image signals can be provided for by electronic circuitry connected within video control or image signal combination means 56 which contains the control circuitry for both of the cameras 51 and 52 or it can be provided for by dual field plate control within the video tube which forms video display screen 55. Appropriate circuitry and/or optics for reproducing a mirror image of the intelligence on webs 45 and the completed program units viewed by the cameras 51 and 52 can be provided within the cameras and/or video control means 56. An electrical conduit 57 is provided along the intersection of panels 27 and 28 for the conductors connecting control means 56 to video screen 55.

The cameras 51 and 52 together with video control means 56 and display screen 55 form a display means for displaying to the learner pair seated at work space 31 predesignated program elements and the completed program units formed by the learner pair's responses to the stimuli.

Presentation control means 58, 59, 60 and 61 illustrated for each means by plates 62 and attached operator knobs 63 are contained within housings 46, 47, 48 and 49, respectively, and function to allow each learner of the learner pair to participate in the control of the program sequence by advancing information webs 45 upwardly. Additional presentation control means for controlling the sequence of the program of cross-synchronized stimulus are contained within the video control means 56 for retaining a count of the number of times each of the learners of the learner pair using work space 31 operates the presentation control means 60 and 61. At predesignated points in the program additional program intelligence consisting of instructional information, response signals, interrogatory stimuli and programmatically correct responses can be displayed directly on video screen 55 from this additional presentation control means located within video control means 56 depending on the number of operational counts received.

Link 64 is shown on the left-hand side of housing 48 in FIG. 1 for transmitting the motion of plate 63 to an operating switch (not shown) located within the housing for generating operational count signals for the program presentation components consisting of means 55 and 56 and information webs 45. A corresponding and cooperating link 65 is located on the right-hand side of housing 48 as shown in FIG. 2 for the same purpose.

Rolls 66 are provided within the housings 46, 47, 48 and 49 immediately below the inner surface of horizontal barrier member 25 in order to store the unused portion of information webs 45 as shown in FIG. 2.

An audio pick-up device 67, illustrated by a microphone, is connected to conduit 57 for picking up the verbal interactions between the learner pair using work space 31. The audio pick-up is electrically connected to an audial storage and replay means 68 which is located in support base 21 as shown in FIG. 2 and consists of audio storage tapes and discs. A continuous audio record device can provide the storage and replay capability in conjunction with an audial propagation means 69 which is illustrated by a loudspeaker opening. A switch (not shown) can be provided for the learner pair to replay any selected time period of their verbal interactions. Also the audial storage and replay means 68 can be used to provide a record by which evaluation of the progress of the learner pair can be made after completion of a program segment or the sound track created can be used in present time as an observation aid.

The electrical equipment in device 20 can be supplied power through power and control conduit 70 which can also convey other signals such as the above-mentioned audial signals or control signals to and from a computer by which the entire module can be controlled. Under computer control video control means 56 and audial storage and replay means 68 can be directly linked to the computer so that information recorded in these means is available to the computer memory bank and so that the program presentation can be controlled by the computer.

Access doors 71 and 72 are provided in support housings 23 and 24, respectively, for replacing video tapes, audial storage devices, and other parts as needed. Handles 73 and 74 are provided for each of the doors, respectively. Camera 51 can be removed along track 75 and camera 52 can be removed along track 76 when the doors are in opened position.

If desired, a video or film projector may also be mounted on tracks 75 and 76 next to the cameras 51 and 52 in order to project on to the underside of transparent plate 50 the program intelligence elements so that the program does not have to be printed on information webs 45. When this is done webs 45 act as a recording and presentation means for the learners' responses and the paper printing cost for information webs 45 is provided. When a video projector is used for this purpose, it can be controlled from the above-mentioned additional program intelligence in video control means 56.

Light intensification means 77 and 78 are provided for work space 31 to raise the light level on information webs 45 whereby an intensified combined video image can be presented by screen 55 and are illustrated by gooseneck lamps affixed to panels 27 and 28, respectively. Similar light intensification means 79 and 80 are provided for work space 30.

An accessory outlet 81 is provided in base support 21 to plug into the presentation means through control means 56. Various accessory devices such as shown in FIGS. 12 and 13 can be plugged into device 20 at this outlet.

The elements and means described in connection with work spaces 30 and 31 are common between each of these work spaces and work space 32 of which only the top portion of video screen 82 can be seen in FIG. 1.

In addition to printed characters web 45 can carry intelligence in braille form.

In operation, a cross-synchronized program of instruction is printed on two information webs 45 and the webs installed in housings 48 and 49 to provide for one pair of learners in work space 31. In simplest form for paired learning, the two webs contain identical instructional information in order to set out the predetermined sequence of learning units, separate response signals for each of the two learners, separate interrogatory modes (stimuli) for the two learners and the programmatically correct responses for each of the interrogatory modes. The electrical components are activated by supplying power to power conduit 70 and the learner pair position themselves, one each at positional indicator housings 48 and 49 and begin the program by reading the instructional information printed on webs 45. They discuss the information in order to increase their mutual comprehension of it and then they both advance the webs 45 to the next program elements which consist of separate response designation signals for the first learner and for the second learner followed by interrogatory modes which require sequential responses first by one of the learner pair and then by the other learner of the pair. The instructional information, response designation signals and interrogatory stimuli are shown on video display screen 55, since cameras 51 and 52 are focused on the images of these program elements. When the sequential written responses are made to the interrogatory stimuli (questions), these are also displayed on screen 55 within the images of the interrogatory modes as completed program units. The learner pair then sees their combined responses presented on the screen. Both learners then pull operator knobs 63 a short distance in a downward direction. These actions then expose the programmatically correct responses (answers) to the learner pair by reason of webs 45 advancing upwardly in order to expose these correct responses to the learners and to display them on the screen 55. The learners then push operator knobs back to their original positions in order to advance the webs 45 to the next program sequence. If desired, the video control and signal recording means 56 can be pre-programmed to project additional program elements on screen 55 from a contained video tape, depending on the count of signals received from the operation of presentation control plates 60 and 61. As above-described, the presentation of this program information can be controlled by an external computer through power and control conduit 70.

In order to structure the above paired learning program, it is necessary to prepare the program elements contained by the intelligence storage means 45 and 56 in a predetermined order in which the instructional information, the response designation signals and the programmatically correct responses are cross-synchronized so that the learners can jointly perceive and respond in an interactive and cross-synchronized manner to the presented program. This manner of interactive perception and response provides for synchronizing the perception and response times between the learner pair so that they perceive the learning process in a joint and mutual fashion and interact and work with each other to accomplish the goal of making the correct responses. The two learners working together cross-check each other as to correctness of responses which can be independently evaluated by a review of the responses recorded upon webs 45 and/or a check-out test designed to test the terminology and key concepts learned. When the learner pair have completed a given program segment, they contact the classroom teacher for the check-out test and instruction as to the next program segment. When the joint responses recorded show too high an error rate, the pair can be programmed into remedial routines for that partiular program segment which can be presented from device 20 also.

Referring now to FIGS. 3 and 3A, an enlarged cross-sectional view of positional indicator housing 48 of FIG. 1 is shown resting removably within horizontal barrier panel 25 on tabs 82 and 83 with plate 62 resting slidably in C-shaped tracks 84 and 85 which are connected to housing side panels 86 and 87, respectively. Transparent plate 50 is shown resting downwardly on retainer tabs 88 and 89 which are integral with side panels 86 and 87, respectively. Link 64 is pivotally connected to the left-hand side of plate 62 and link 65 is shown pivotally connected to the right-hand side of plate 62. Each of these links extends through slots (not shown) in the outside portions of C-shaped tracks 84 and 85 for movement with plate 62 when a learner pulls knob 63 downward. Information web 45 is shown extended from transparent plate 50 onto its rolled form on storage reel 90 under plate 62. Reel axle 91 rests rotatably and removably in U-shaped brackets 92 and 93 so that the reel 90 can be replaced with an empty reel for taking up the next information web when a given program segment is complete by raising housing 48 out of horizontal barrier member 25. If desired, conventional, releasable securing means can be employed to connect the various elements of housing 48 so that the information web and the storage reel can be easily removed prior to program completion. Storage reel 90 is rotated by pulley 94 which is integrally connected to the axle 91 thereof. Power belt 95 is connected between pulley 94 and driven pulley 96 which is illustrated in dotted lines on the undersurface of horizontal barrier member 25 directly connected to motor 97 as shown in FIG. 3A. Information web storage roll 66 is shown coiled on reel 98 on the undersurface of barrier member 25 at the opposite end of transparent plate 50 from reel 90. Operating micro-switch 99 is shown by dotted lines positioned close to reel 98 between the two information web reels.

Switch 99 is designed to be activated by an activator tab 100 shown attached to the undersurface of control plate 101 in FIG. 3B. Plate 101 is connected to the bottom ends of links 64 and 65 and is moved in a downward direction as shown by arrow D when the knob 63 is pulled down from position P1 by the learner positioned at housing 48 to position P2 shown by phantom lines. As plate 101 is returned to position P1, switch 99 is again activated to provide a count signal indicating that the programmatically correct response has been viewed by that learner and that the next program unit has been advanced by the presentation control or video control means 56 which controls power to motor 97. If desired, the video control means 56 can be programmed to go into an inactive mode until the corresponding count signal has been received from the operator switch activated by the second learner of the learner pair using work space 31.

The plate 62, operator knob 63, links 64 and 65, motor 97, operator switch 99, activator tab 100, control plate 101 and the control circuitry within video control means 56 comprise the fully operative presentation control means 60 disclosed in connection with FIGS. 1 and 2.

Referring now to FIGS. 4 and 5, a modified device 110 for paired learning is shown in which opaque projector reflector hoods 111, 112 and 113 are provided over the positional indicator housings 114, 115 and 116 which are identical to the corresponding housings described with respect to FIGS. 1 and 2. An opaque projector reflector hood 117 is provided for the second positional indicator housing (not shown) in work space 118. The program presentation means components for one work space illustrated in FIGS. 1 and 2 as cameras 51 and 52, video control means 56 and video display screen 55 are replaced by the opaque projector reflectors, their associated opaque projectors 119, 120, 121 and 122, two photographic projectors illustrated for housing 114 only by projector 123 (shown in FIG. 5) and reflector screen 124. In this modification, projector 123 is designed for frame-by-frame advancement and projects the instructional information on the undersurface of recordation web 125 which as illustrated is an unprinted paper roll. The inverted U-shaped lamp tubes 128 located on the interior surface of opaque reflector hood 117 intensify the light level within the reflector which level is also increased by a highly reflective interior surface inside of opaque reflector hood 117. The image presented on recordation web 125 is transmitted to prism 127 located in opaque projector 120 and then through lens system 128 and projected onto reflector screen 124. When the learner seated at housing 114 records written responses to the presented information on recordation web 125, these responses are opaque projected within the program intelligence images onto screen 124.

Opaque projector 120 is comprised of a housing 129 which can be removable or rigidly connected to reflector hood 117. When removably connected, a photographic film storage means 130 can be accommodated within housing 129 in order to project additional program information onto screen 124. As illustrated in FIG. 5, this means consists of a film cassette 131 and a drive wheel 132 which can be controlled by a presentation control means and a drive motor (not shown) depending upon count signals received from micro-switch 133 located in bracket 134 on the undersurface of housing 114. The film loop 135 from cassette 131 can be threaded through opaque projector 120 by conventional means so that it is removed from the line of projection when not in focus as shown by flattened portion 136. An additional drive means for cassette 131 may also be provided from the same drive motor as above-mentioned.

Inverted U-shaped lamp tubes 126 are connected by the sockets thereof to bus bars 137 and 138 which are connected to the presentation control means of device 118 (not shown). Control and operator plate 139 is identical to plate 101 of FIG. 3B and rests in bracket 134 as shown in FIG. 5. The remaining components of housing 114 are identical to those described in FIGS. 3, 3A and 3B wherein reel brackets shown as front bracket 140 and rear bracket 141 are shown for supporting motor 142 and reel 143 in FIG. 5, although these elements are not illustrated in the FIG. 3 series of views. The operation of the presentation control means of housing 114 is identical to the operation described for that means as illustrated and described for FIGS. 1, 2, 3, 3A and 3B. As shown in FIG. 5, a hinge 144 is connected along the front side of housing 114 and horizontal panel 145 to provide for restrained pivotal action of housing 114 under hood 117 for removing spent recordation web 125 which is reeled onto front reel 146.

If desired, the control plate 62 of the previous figures and identical plate 147 of FIG. 5 can be designed in bar form rather than in the plate form as shown in order to project the full image area of the completed program units as they appear on recordation web 125 onto screen 124. In the form shown in FIG. 5, control plate 139 functions to restrict part of the projected beam from projector 123 from striking recordation web 125 as it overlies transparent plate 148. This restricted part of the projected beam can be arranged to project the programmatically correct answers to the learner so that the film is not required to advance to the next intelligence frame in order to show the answers. However, since operator tab 100 shown in FIG. 3B activates switch 133, the subsequent film frame can be easily advanced by a count signal from this switch.

As shown in FIG. 4, the projected beams from opaque projectors 121 and 122 are focused in a combined fashion on reflector screen 124 so that a combined image is effected similar to the combined images produced by the display means of FIGS. 1 and 2.

The operational steps are the same for device 110 as for device 20 with the above-described variations.

An audio pickup microphone 149 and a loudspeaker 150 are provided as in FIGS. 1 and 2. Similar audial storage and replay means (not shown) are provided within the base 151 of device 110. The other components of device 110 such as the learner seats 152, indentations 153 and power and control conduit 154 which can provide a computer control for the projectors illustrated by 123 are also provided. Screens 155 and 156 for the other two work spaces are shown at the top center of device 110.

Referring now to FIG. 6, a second modification of device 20 shown in FIGS. 1 and 2 is illustrated as device 160, in which three video display screens 161, 162 and 163 are shown attached to the upper portions of upright panels 164 and 165. The video control means of device 160 (not shown) is designed to project the program element images presented by information webs 166 onto two of the video screens shown for work space 167. Each of the positional indicator housings 168 and 169 of work space 167 have associated therewith display control means 170 and 171, respectively, both of which consist of two button control means mounted flush with the top surface of horizontal barrier member 172, one of which permits the image on one of the information webs in work space 167 to be projected in combined fashion on central video screen 162 with the image from the other information web and the other button of which permits display of the program image on one of the side screens 161 and 163. Thus, for housing 168 the learner can select to project the intelligence image on central screen 162 or side screen 163 and the learner at housing position 169 can elect screen 162 for a combined image or 161 for an individual image. The value of this modification is to allow a pre-check by each learner of the responses made by the other learner prior to the combination of the paired responses on display screen 162.

The other components of device 160 are identical to device 20. Three pairs of learners are provided for by like work spaces 173 and 174 which have the same display control means as the described work space 167 as illustrated by button panel 175 in work space 173.

Referring now to FIG. 7, the presentation means of FIGS. 1 and 2 is replaced in device 180 for work space 181, by simulator parts 182 and 183 and workbook 184 and for work space 185 by workbooks 186 and 187. The simulator parts 182 and 183 are illustrated by distributors 188 and 189 each of which can be connected by lines 190 and 191 to an eight cylinder engine by the four cylinder lines thereof, so that the learner pair must make the correct interactive adjustments to the simulator parts in order to make the engine (not shown) run properly. According to this example, the engine functions as a signal comparator means 192 whereby the manipulations of the learners on the distributors are compared to the correct manipulations to provide learning feedback. If desired, artificial simulators with signal comparison display means 193 can be employed in lieu of the engine as shown in schematic form. The instructional information and other program elements leading up to this proper manipulation of the simulator parts is set out in cross-synchronized workbook 184. As shown, variable clamp means 194 and 195 are provided for parts 183 and 184, respectively.

When simulator parts are not necessary as in the learning stages leading up to the physical manipulation of the simulator parts 182 and 183, the cross-synchronized learning program can be supplied solely by workbooks 186 and 187 which contain all program intelligence, including response designation signals and programmatically correct answers. The response signals in this mode can call for an exchange of books so that the interactive responses can be made in a single book. Paired learning can be effectively carried out by employing only one of workbooks 186 and 187 and recording the joint, interactive, written responses in the one book according to the response designation signals provided in the workbook.

Referring now to FIGS. 8 and 9, a fourth modification of device 20 is illustrated as paired learning device 200 in which a single camera 201, a prism means 202 and a pair of mirrors 203 and 204 replace the two cameras 51 and 52 of that device. The images from the information webs 205 and 206 are reflected by mirrors 203 and 204, respectively, into prism means 202 and then into the lens system of camera 201 in order to produce an optically combined image in video camera 201 and then via conduit 207 to video display screen 208.

The other components of device 200 are identical to those of device 20 as shown.

Referring to FIG. 10, a fifth modification of the device 20 is illustrated as paired learning device 220 wherein a first program presentation means 221 is illustrated as being movable between position 222 (identified by the square figure) and position 223 of work space 224 by reason of its being mounted on pivotal arm 225 and wherein a second presentation means 226 is illustrated as being movable between position 227 of work space 228 and position 229 of that work space (identified by the triangular figure) by reason of its being mounted on pivotal arm 230.

Program presentation means 226 as shown at position 227 in work space 228 covers a square figure identical to that shown for position 222. This square figure and the above-mentioned triangular figure at position 229 function as positional indication means for the students and also function as learner designation means so that, for example, the learner at the square figure is designated as learner 1 and the learner at the triangular figure is designated as learner 2. The program presented by presentation means 226 can then have a response designation means to present the response designation signals, similar squares and triangular figures to the learner pair so that when a square figures appears in the presented program, the learner at position 227 makes the response to the interrogatory stimulus and so that when a triangular figure appears the learner at position 229 makes the response to the presented interrogatory stimulus. Thus, the triangular and square figures on device 220 are learner designation means and the same figures appearing in the program are cross-synchronized response designation signals.

The pivotal arm 230 is mounted in base mount 231 which is located on horizontal barrier member 232 at central position 233 which is defined by the intersection of up-right panels 234 and 235 which comprise the perception convergence means for work space 228 and are identical to up-right barrier panels 27 and 28 of device 20 in FIGS. 1 and 2.

In operation, the presentation means 221 of work space 224 is equipped with a cross-syncrhonized program of stimulus which is contained in projector 236 which is positioned in the rear portion of the presentation means 221 as shown in the enlarged sectional view in FIG. 11. This projector 236 projects the program images contained on the photographic film contained therein onto mirror 237 and then to the undersurface of transparent plate 238 over which a recordation web 239 is moved by front power driven reel 240 which is operated by motor 241 with a pulley as above disclosed for device 20. This motor is controlled by control means 242 which is in turn controlled by operator switch 243 located at the top of the writing surface 244 under operator knob 245. The control plate 246 and the bottom plate 247 correspond to plates 147 and 139, respectively, and are arranged for slidable action within tracks 248 which are affixed to the inclined surface 249 of housing 250. Housing 250 also contains audio presentation means 251 and loudspeaker 252. As shown, projector 236 is designed for removal from housing 250 by pulling handle 253 in order to change program films. In this presentation means, the information web 239 functions as a recordation means only since all program elements can be placed on film. If desired, certain program elements can be printed on the web 239. The operation of the two control means 242 and 251 are controlled count signals from operator switch 243. Control means 242 also contains a battery for electrical power to projector 236, motor 241 and audio system 251.

In operation, the presented cross-synchronized program for paired learning is responded to by the learner at position 223 and then pivoted to position 222 where the other learner of the learner pair responds in a sequential and interactive fashion to the presented program.

FIG. 12 and 13 illustrate a tactile input accessory device which can be used in conjunction with paired learning devices 20, 160 and 200. A transducer bank 260 is provided with a signal conductor 261 and a tethered tactile probe 262 for activating the contained pressure sensitive transducers. Three pairs of clip fingers 263, 264 and 265 are provided at the edges of bank 260 in order to clamp the same on the positional indicator housings of the identical devices as shown by the cross-sectional view of FIG. 13 which illustrates housing 48 of FIGS. 1 and 2. Transducer bank 260 is composed of individual transducers 266 and a support member 267 therefor.

In operation, conductor 261 is connected to outlet plug 81 of FIGS. 1 and 2 and the transducers activated by tactile probe 262 as required by responses needed for program completion. The pattern of activation of the transducers is interpreted by video control means 56 and displayed on video screen 55, in comparision with the programmatically correct pattern or image for forming a paired learning loop for the presented graphic program elements.

When transducers 266 are sufficiently sensitive, they can be activated by the learner pair's fingers to effect a digital tactile use for making graphic patterned responses. The features of this invention which have been described above in connection with the disclosed devices can be exchanged between those devices by exercising conventional skill in the art.

While the invention has been described in connection with different embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains, and as may be applied to the essential features hereinbefore set forth and as fall within the spirit and scope of the invention or the limits of the appended claims.

What is claimed is:

1. A device to facilitate mutually interactive paired learning by at least one learner pair comprising a work space to provide for one learner pair; a presentation means located within said work space for transmitting to said learner pair a cross-synchronized stimulus field, said presentation means including intelligence storage means for the presented elements of said stimulus field; and said intelligence storage means including instructional information, response designation signals, interrogatory stimuli and programmatically correct responses for purposes of comparison with learner responses.

2. A device as defined in claim 1 wherein said intelligence storage means is selected from the class of video tapes, photographic films, printed webs and audio storage tapes and discs.

3. A device as defined in claim 1 wherein said response designation signals of said intelligence storage means designates the type of response which should be made by each of the learners of said learner pair to a given stimulus from said interrogatory stimuli.

4. A device as defined in claim 1 wherein said response designation signals of said intelligence storage means designates the sequence of responses which should be made by each of the learners of said learner pair to a given stimulus from said interrogatory stimuli.

5. A device as defined in claim 1 wherein said presentation means includes separate intelligence storage means for each learner of said learner pair and wherein said intelligence storage means are cross-synchronized to present a paired learning program to said learner pair.

6. A device as defined in claim 1 wherein said presentation means for transmitting a cross-synchronized field of stimulus to said learner pair includes a light propagation means for transmitting stimulus images to said learner pair.

7. A device as defined in claim 1 including a recordation means for use by each learner of said learner pair and designed to record responses made by each learner to said cross-synchronized field of stimulus.

8. A device as defined in claim 1 wherein said presentation means is computer controlled.

9. A device as defined in claim 1, including an audio recordation and storage means to record the verbal interactions of said learner pair.

10. A device as defined in claim 1, including an audio pickup and replay means operable by said learner pair for recording the verbal interaction between said pair and replaying the same upon command.

11. A device as defined in claim 1 wherein three work spaces are provided to accommodate three separate learner pairs.

12. A device as defined in claim 1 including a perception convergence means to focus the perception of each of the learners of said learner pair on one another and on a cross-synchronized stimulus field, whereby the learning stimuli to said learner pair can be fully specified and control exercised over interactive responses, said perception convergence means partially defining said work space.

13. A device as defined in claim 12 wherein said perception convergence means comprises a horizontal barrier member defining the lower-most boundary of said work space and at least one up-right barrier panel for blocking external stimuli from said learner pair and for promoting control over interactive responses between learners.

14. A device as defined in claim 12 wherein said perception convergence means comprises at least two up-right barrier panels for converging the mutual perceptions of said learner pair and for blocking external stimuli and for promoting control over interactive responses between learners.

15. A device as defined in claim 12 wherein said perception convergence means comprises a horizontal barrier member defining the lower-most boundary of said work space and at least two up-right barrier panels for blocking external stimuli and for promoting control over interactive responses beteen the learners of said learner pair.

16. A device to facilitate mutually interactive paired learning by at least one learner pair comprising a work space to provide for one learner pair and a presentation means located within said work space for transmitting to said learner pair a cross-synchronized stimulus field; recordation means located within said work space for use by each learner of said learner pair and designed to record responses made by each learner to said cross-synchronized field of stimulus; and said presentation means including a light propagation means for transmitting stimulus images to said learner pair through said recordation means whereby each learner of said learner pair views his recorded responses within said stimulus images.

17. A device as defined in claim 16 wherein said recordation means forms a permanent record of the responses made.

18. A device to facilitate mutually interactive paired learning by at least one learner pair comprising a work space to provide for one learner pair; and a presentation means located within said work space for transmitting to said learner pair a cross-synchronized stimulus field including stimulus images, and including a recordation means for use by each learner of said learner pair and designed to record responses made by each learner to predesignated program elements of said cross-synchronized field of stimulus; and said presentation means including light propagation display means for transmitting stimulus images to said learner pair for permitting viewing of recorded responses within said stimulus images.

19. A device as defined in claim 18 wherein said display means permits display within a single image area whereby said learner pair can compare the degree of conformity of their joint and interactive responses with respect to one another and to the programmatically correct responses.

20. A device as defined in claim 18 wherein said display means permits display within two or more image areas.

21. A device as defined in claim 18 wherein at least one of said predesignated program elements is the programmatically correct response and wherein said display means permits display within a single image area whereby said learner pair can compare the degree of conformity of their joint and interactive responses with respect to one another and with respect to the programmatically correct response.

22. A device to facilitate mutually interactive paired learning by at least one learner pair comprising a work space to provide for one learner pair; a presentation means located within said work space for transmitting to said learner pair a cross-synchronized stimulus field; said presentation means including intelligence storage means for the presented elements of said stimulus field; and said intelligence storage means including instructional information and interrogatory stimuli; and learner positioning means for controlling the relative positions of each learner of said learner pair within an angle of 130° with respect to each other in a relationship to said work space to focus the perception of said learner pair on said cross-synchronized stimulus field.

23. A device as defined in claim 22 including a horizontal barrier member defining the lower-most boundary of said work space and wherein said positioning means comprises a pair of learner positioning indentations in the outer edge of said horizontal barrier member to position one learner each of said learner pair.

24. A device to facilitate mutually interactive paired learning by at least one learner pair, comprising a work space to provide for one learner pair, a presentation means located within said work space for transmitting to said learner pair a cross-synchronized stimulus field, said presentation means comprising separate intelligence storage means for each learner of said learner pair and separate recordation means for each learner of said pair for recording responses made to said cross-synchronized stimulus field.

25. A device as defined in claim 24 wherein said intelligence storage means and said recordation means for said learner pair comprise different parts of two separate printed information webs.

26. A device as defined in claim 25 including a light intensification means for raising the light level in the vicinity of said printed information webs for increasing the brightness thereof for display.

27. A device as defined in claim 25 including display means for displaying to said learner pair the completed program units formed by the learner pair's responses to said stimulus field as recorded upon said printed webs for promoting the formation of paired learning loops.

28. A device as defined in claim 27 wherein said display means displays the completed program units of both of said learners of said learner pair in a single image area to allow a combined work product to be jointly viewed by said learner pair to ascertain correctness of response in a paired learning loop.

29. A device as defined in claim 27 wherein said display means displays the completed program units of each of said learners in separate image areas.

30. A device as defined in claim 27 wherein said display means comprises two separate video cameras focused separately on said printed webs, an image signal combination means, and a video display screen whereby said learner pair sees the presented intelligence from said stimulus field and their joint responses thereto in a single image area on said display screen.

31. A device as defined in claim 27 wherein said display means comprises a prism means for combining the images of said printed information webs, a video camera focused on said prism means and generating image signals of the optically combined images, and a video display screen for accepting signals from said camera whereby said learner pair sees the presented intelligence from said stimulus field and their joint responses thereto displayed in a single image area on said display screen.

32. A device as defined in claim 24 wherein said intelligence storage means includes an audio storage means and an audial propagation means therefor to present audial stimuli to said learner pair.

33. A device as defined in claim 24 including an audio pickup and replay means for recording the verbal interactions of said learner pair and replaying the same upon command from said pair.

34. A device as defined in claim 24 wherein three work spaces are provided to accommodate three separate learner pairs.

35. A device as defined in claim 24 wherein said presentation means for transmitting said cross-synchronized stimulus field includes a control means for controlling the presentation of predesignated portions of said stimulus field to each of said learners of said learner pair.

36. A device as defined in claim 35 wherein said presentation means for transmitting said cross-synchronized stimulus field includes two separate operating switches, each of which are in turn controlled by each of the learners of said learner pair, signal recording means for accepting signals from said operating switches and for controlling the presentation of said cross-synchronized stimulus field with respect to the number of signals received by said signal recording means from each of said operating switches whereby the presentation of stimuli to each of the learners of said learner pair and their responses thereto are controlled to promote the formation of paired learning loops.

37. A device as defined in claim 24 wherein said intelligence storage means and said recordation means for said learner pair comprise different parts of two separate printed information webs, said device including display means for displaying to said learner pair the completed program units formed by the learner pair responses to said stimulus field as recorded upon said printed webs, a combined image video display screen and two separate image display screens for independently displaying the completed program units of each of said learner pair, said video display screen for combined images displaying the combined images of the completed program units of both of said learners of said learner pair in a single image area, and display control means for allowing each of said learners of said learner pair to independently control the display of each of their completed units in either combined image form or single image area form as required by the response signals contained in cross-synchronized stimulus field.

38. A device as defined in claim 24 wherein said intelligence storage means comprises a video record tape and wherein said presentation means includes a video display screen controlled by said video record tape.

39. A device as defined in claim 24 wherein three work spaces are provided to accommodate three separate learner pairs.

40. A device to facilitate mutually interactive paired learning by at least one learner pair comprising a work space to provide for one learner pair, a presentation means located within said work space for transmitting to said learner pair a cross-synchronized stimulus field, said presentation means comprising separate intelligence storage and propagation means for each learner of said learner pair and a separate recordation means for each learner of said learner pair for recording responses made to said cross-synchronized stimulus field.

41. A device as defined in claim 40 wherein said intelligence storage and propagation means projects the stored intelligence of said cross-synchronized stimulus field onto said recordation means whereby each of the learners of said learner pair can record responses to the stimuli presented within the image of the presented program units.

42. A device as defined in claim 41 wherein an opaque projection means is focused upon the image created by said intelligence propagation means and the image of the responses made upon said recordation means, said opaque projection means comprising two separate opaque projectors for each of the learners of said learner pair.

43. A device as defined in claim 42 wherein the images projected by both of said opaque projectors are combined onto a single display screen in order to provide said learner pair with a combined image of their joint and interactive responses to said cross-synchronized stimulus field.

44. A device as defined in claim 42 wherein each of said opaque projectors comprises a light source, a prism focused on said recordation means and a light source for projecting the image from said prism.

45. A device as defined in claim 40 wherein said presentation means for transmitting said cross-synchronized stimulus field includes a control means for controlling the presentation of predesignated portions of said intelligence projected by said intelligence storage and propagation means, said control means comprising separate blocking plates for each of the learners of said learner pair and wherein each of said blocking plates can be independently controlled by one each of said learner pair for controlling the presentation of predesignated portions of said stimulus field according to the response designation signals received from said cross-synchronized stimulus field.

46. A device as defined in claim 40 wherein said intelligence storage and propagation means includes a first projection means for projecting said cross-synchronized stimulus field onto said recordation means and a second intelligence projection means for combining the intelligence images with the images from said recordation means.

47. A device to facilitate mutually interactive paired learning by at least one learner pair comprising a work space to provide for one learner pair, a presentation means located within said work space for transmitting to said learner pair a cross-synchronized stimulus field, said presentation means comprising at least one printed information web including instructional information, response designation signals, interrogatory stimuli, and programmatically correct responses for each learner of said learner pair arranged in a cross-synchronized fashion whereby said learner pair responds to the program stimuli in joint and interactive manner to form paired learning loops.

48. A device as defined in claim 47 including a first learning simulator for one of the learners of said learner pair and a second learning simulator for the other learner of said pair, said learning simulators releasably held in said device and connected through a signal comparator means whereby the physical manipulations by each of the learners of said learner pair on their respective learning simulators are compared in said signal comparator means and the feedback of the comparison between the signals given to said learner pair to form paired learning loops.

49. A device to facilitate mutually interactive paired learning by at least one learner pair comprising a work space to provide for one learner pair, a presentation means located within said work space for transmitting to said learner pair a cross-synchronized stimulus field, said presentation means comprising a first simulator means for one of said learners of said learner pair and a second simulator means for the other learner of said learner pair, said learning simulators releasably held in said device and connected through a signal comparator means whereby the physical manipulations by each of the learners of said learner pair on their respective learning simulators are compared in said signal comparator means and the feedback of the comparison between the signals given to said learner pair.

50. A device to facilitate mutually interactive paired learning by at least one learner pair comprising a work space to provide for one learner pair, a presentation means located within said work space for transmitting to said learner pair a cross-synchronized stimulus field, said presentation means comprising an intelligence storage means for said learner pair and a recordation means for said learner pair for recording responses made to said cross-synchronized stimulus field by said learner pair, said presentation means and said recordation means contained within a single housing, said housing movable between each learner of said learner pair whereby presented intelligence may be sequentially viewed by said learner pair and responses recorded in reciprocal fashion by said learner pair.

51. A device as defined in claim 50 wherein said housing is pivotally mounted within said device for movement between each of the learners of said learner pair.

52. A device as defined in claim 24 wherein said recordation means comprises a bank of pressure-sensitive transducers and a probe for exerting pressure on selected transducers in said transducer bank, and wherein the signals generated by said transducers are received by a video control means and displayed on a video display screen.

53. A device as defined in claim 52 wherein separate transducer banks and probes are provided for each of the learners of said learner pair and wherein the signals produced by the transducers of each of said transducer banks are received by and combined in a video-controlled means, and a video display screen for displaying the imges produced by said combined signals.

54. A device as defined in claim 52 wherein said transducer bank is removably attached to said device.

55. The process of providing mutually interactive paired learning between a learner pair to form paired learning loops comprising the steps of presenting an instructional information stimulus field to each learner of the learner pair, designating a first learner and a second learner of said learner pair, presenting cross-synchronized response designation signals to said learner pair to designate the type and sequence of responses required by said first learner and the type and sequence of responses required by said second learner, presenting interrogatory stimuli to each learner of the learner pair which designates the response requirements for said first and said second learner as established by said presented response designation signals, providing for the recordation of the responses of each of said learners of said learner pair, and furnishing comparisons of the recorded responses made by said first and said second learner of said learner pair with respect to the programmatically correct responses by displaying to said learner pair the programmatically correct responses to said interrogatory stimuli whereby a mutually interactive and cross-synchronized learning loop is established and maintained for each learner of said learner pair.

56. The process of paired learning by a learner pair comprising the process steps represented by the following flow diagram:

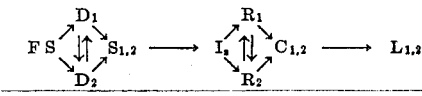

Wherein,
- FS = presenting an instructional information stimulus field to the learner pair.
- $D_1$ = designating one of the learners as learner 1 for interaction with SF and the other learner,
- $D_2$ = designating the other learner as learner 2 for interaction with SF and learner 1,
- $S_{1,2}$ = presenting cross-synchronized response designation signals to the learner pair,
- $I_s$ = presenting the cross-synchronized interrogatory stimuli to the pair,
- $R_1$ = making and/or recording of responses to $I_s$ by learner 1,
- $R_2$ = making of and/or recording of responses to $I_s$ by learner 2,
- $C_{1,2}$ = comparison of the recorded responses with respect to the programmatically correct responses displayed by learner 1 and learner 2, and
- $L_{1,2}$ = establishment of a paired learner loop between learner 1 and learner 2.

57. The process of mutually interactive pair learning by a learner pair comprising the steps of jointly comprehending a cross-synchronized instructional information sequence, designating themselves first learner and second learner, receiving response designation signals which designate the type and sequence of responses required by the first learner pair and the type and sequence of responses required by said second learner, jointly comprehending interrogatory stimuli which are designated for response by said first and said second learner according to said response signals, recording the joint responses made according to the response signals, viewing the programmatically correct responses to said interrogatory stimuli, and comparing the joint responses recorded with the programmatically correct responses viewed whereby a mutually interactive and cross-synchronized learning loop is established and maintained between each learner of said learner pair.

58. A device to facilitate mutually interactive paired learning by at least one learner pair comprising a work space to provide for one learner pair; presentation means located within said work space for transmitting to said learner pair a cross-synchronized stimulus field; learner positioning means for controlling the relative positions of each learner of said learner pair with respect to each other in relationship to said work space to focus the perception of each learner pair on said cross-synchronized stimulus field; a horizontal barrier member defining the lower-most boundary of said work space; and said positioning means comprises a pair of learner positioning indentations in the outer edge of said horizontal barrier member to position one learner each of said learner pair, and a pair of learner seats affixed to said device in such a manner that the positional axes defined by the centers of said seats and the midpoints of said positioning indentations intersect at an angle of 130° or less.

59. A device to facilitate mutually interactive paired learning by at least one learner pair comprising a work space to provide for one learner pair; presentation means located within said work space for transmitting to said learner pair a cross-synchronized stimulus field; learner positioning means for controlling the relative positions of each learner of said learner pair with respect to each other in relationship to said work space to focus the perception of each learner pair on said cross-synchronized stimulus field; and said positioning means comprising positional indicators for each learner of said learner pair whereby each learner of said learner pair has an indication of the position which he should occupy with respect to the other learner of said learner pair.

60. A device to facilitate mutually interactive paired learning by at least one learner pair comprising a work space to provide for one learner pair; a presentation means located within said work space for transmitting to said learner pair a cross-synchronized stimulus field, said presentation means including intelligence storage means for the presented elements of said stimulus field; and said intelligence storage means including instructional information, response designation signals, and interrogatory stimuli for use by the learner pair.

61. A device as defined in claim 60 including learner designation means affixed to said device for specifying the learner positions at said device.

* * * * *